(No Model.)
L. A. STAUB.
PROCESS OF AND APPARATUS FOR DECOMPOSING BICARBONATE OF SODA.
No. 439,330. Patented Oct. 28, 1890.
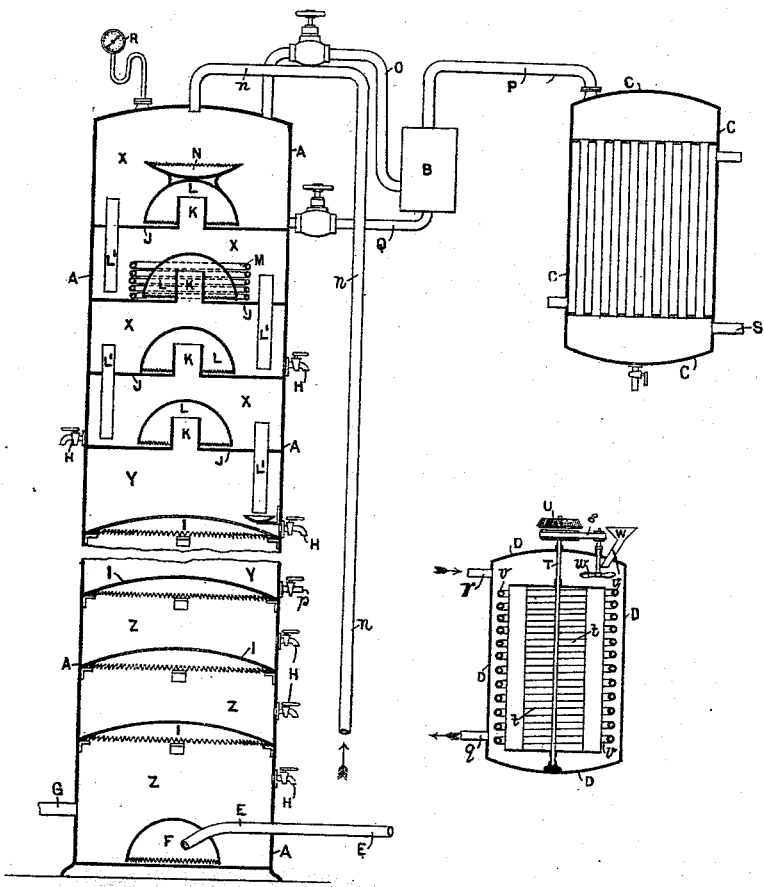
Witnesses
H. R. Kennedy
J. G. Jones.
Inventor
L. A. Staub
By his Atty.
Phil T. Dodge.

UNITED STATES PATENT OFFICE.

LEONHARD A. STAUB, OF WINNINGTON, ENGLAND.

PROCESS OF AND APPARATUS FOR DECOMPOSING BICARBONATE OF SODA.

SPECIFICATION forming part of Letters Patent No. 439,330, dated October 28, 1890.

Application filed May 11, 1888. Serial No. 273,571. (No model.)

*To all whom it may concern:*

Be it known that I, LEONHARD ADOLF STAUB, D. Sc., a citizen of the Republic of Switzerland, residing at Winnington, in the county of Chester, in the Kingdom of England, have invented certain new and useful Improvements in Obtaining Carbonic Acid and Monocarbonate of Soda, and Apparatus Therefor, of which the following is a specification.

This invention relates to the manufacture of monocarbonate of soda and almost pure carbonic acid from the bicarbonate of soda (such as is obtained by the ammonia-soda process) by means of ammonia or such compounds thereof as are hereinafter mentioned, and in such a way that a strong solution of carbonate of soda is obtained, which is directly applicable for the manufacture of crystallized carbonates of soda and of caustic soda. I have found that if ammonia or any of its compounds, with carbonic acid or sulphureted hydrogen, be mixed in solution with bicarbonate and heated to somewhat below the boiling-point the carbonate of ammonia thus formed or introduced is decomposed into carbonic acid, which escapes, and free or caustic ammonia, which partly remains in solution. The ammonia remaining in solution appears to form again a carbonate at the expense of part of the carbonic acid of the bicarbonate of soda, and this in turn appears to be redecomposed and the alternate reactions continued until there remains a solution of monocarbonate of soda and of free ammonia, the ammonia acting, in fact, as a carrier to deprive the bicarbonate of a part of its carbonic acid. The ammonia remaining in solution may be driven out by boiling. Similar reactions take place if ammonia or such compounds as hereinbefore mentioned are passed in gaseous form through such a solution or mixture at a temperature below the boiling-point of the solution. Pressure favors the reactions, inasmuch as it increases the solubility of the free ammonia at the given temperatures without affecting to any material extent the dissociation of the carbonate of ammonia.

This invention may be carried out in different ways. A convenient apparatus for the purpose is shown in the accompanying drawing. In this A is an upright cylinder formed of boiler-plate or other suitable material; B, a gas-trap; C, tubular condenser for condensing the steam and other condensable gases that escape with the carbonic acid; D, a mixer for mixing the bicarbonate with water or with a solution of carbonate of soda.

E is the steam-inlet; F, bell with serrated bottom placed over the steam-orifice to divide the steam into numerous streams or bubbles; G, blow-off pipe; H, small test-cocks arranged at intervals to near the top; I I, perforated diaphragms with serrated edges to break up the streams of steam and gaseous matter; J, other diaphragms having vertical tubes K to allow the steam and gaseous matter to rise through; L, bell over same, with serrated edge to break up and distribute the gaseous ascending matters; L', a tube with its orifice a trifle lower than the orifice of K to allow the liquid to overflow into it and descend; M, coil with connections through the side of the chamber of the cylinder; N, cup with serrated edge to receive the mixed bicarbonate and solution as it is pumped through the pipe $n$ from the mixer D by any suitable pump, (not shown;) O, pipe carrying the carbonic acid and waste steam to the gas-trap B; P, pipe from gas-trap to condenser C; Q, pipe with cock to return the condensed water from gas-trap B to the apparatus; $p$, entrance of ammonia under pressure; R, pressure-gage; S, gas-outlet from condenser.

T is a shaft revolved by bevel-gear U or other suitable means; $t$, stirrers on shaft T; $v$, heating-coil surrounding stirrers; W, hopper for bicarbonate.

$w$ is a revolving beater or distributer to distribute the bicarbonate. It is run by belt $s$ from shaft T.

$r$ represents an entrance for liquor; $q$, exit for mixture.

The mode of action is as follows: The bicarbonate—such as is obtained in the ammonia-soda process—is mixed with water or with the liquors left after the process has been partly or completely carried out. This mixing operation is performed at a temperature of about 60° centigrade in the closed mixer D, provided with the heating-coil $v$ and agitator T $t$. The treatment of the solution or mixture thus obtained with ammonia or such compounds as above described may be carried out in any of the well-known distilling-columns or in any combination thereof with the absorbing columns or towers used in the ammonia-soda process. The drawing shows a very convenient form of apparatus. The solution or mixture of the bicarbonate with water or liquor is introduced into this apparatus at or near the top by a pipe n. The ammonia or such other compound as above described is introduced at one or more points, as at p, near the bottom of the column, yet sufficiently high up to prevent any being lost with the run-off liquors. The temperature at that point being kept above 100° centigrade is sufficiently elevated to prevent the absorption of the ammonia. The latter, together with the steam introduced at E or evolved by heating appliances at the bottom of the apparatus, ascends through the liquor, which gradually flows down from the top of the column and combines in the zones marked X X with part of the carbonic acid of the bicarbonate contained therein. The steam can also be introduced directly at the same point or points. Of the mixture of carbonate of soda and carbonate of ammonia thus obtained the carbonate of ammonia as it approaches the lower or hotter parts of the column becomes gradually decomposed in the zones marked Y Y into free ammonia, which remains in solution, and into carbonic acid, which ascends through the liquor, and is allowed to escape at the top through the pipe O. As the liquor reaches the zones Z Z at the bottom part of the column, owing to the higher temperature there, sodium carbonate alone remains in solution, and the free ammonia is driven out and ascends, being absorbed by the liquors in the upper parts of the column, and again acting in the zones X X, as above described, on the bicarbonate. Thus, if the column be once properly started, only sufficient ammonia to make up for any losses that may occur need be introduced. The dissociation of the ammonium carbonate obtained during the process may be greatly hastened by agitation; but it will be generally found that the passage of the gases and vapors, aided by the form of the apparatus employed, causes sufficient agitation for the purpose. The soda-liquor thus freed from ammonia and carbonic acid is drawn off by suitable arrangements at the bottom of the column, such as by a pipe G. Instead of introducing the ammonia near the bottom of the column, the bicarbonate may be sent into the upper part of the column already mixed with solutions of ammonia or such compounds thereof as above described—as, for instance, with gas-liquor. I may also send the bicarbonate into the lower part of the column at any convenient point in the solid form, or mixed with a small quantity of water, or with a concentrated solution of carbonate of soda in the form of a semi-liquid mud. In this case the resultant liquors collected in the lower part of the apparatus will contain solid monocarbonate in suspension. To the bicarbonate thus introduced, ammonia or any of its compounds may be added to insure a speedy decomposition. In order to insure a complete absorption of the free ammonia by the liquor in the upper parts of the column without absorbing any carbonic acid, it may be advisable to introduce coils M or other well-known means to regulate the temperature. The carbonic acid evolved during the process and the steam and ammonia which may be carried along with it are passed through a suitable cooling apparatus C, where the steam and ammonia are condensed. The carbonic acid which can thus be obtained is almost perfectly pure, and may be used for the manufacture of pure bicarbonate of soda or any other useful purpose where impure carbonic acid would not answer. The soda-liquor thus obtained direct from the bicarbonate generally contains some organic matter, which can easily be destroyed on applying suitable oxydizing agents. The soda-liquor can be used in the ordinary manner for the manufacture of the different crystalized carbonates or for caustic soda making by the well-known lime process.

I claim as my invention—

1. The process for obtaining monocarbonate of soda and nearly pure carbonic acid from bicarbonate of soda, which consists in mixing the bicarbonate with water or with a solution of monocarbonate at about 60° centigrade, heating this mixture under pressure with steam, introducing ammonia in the upper part of the column of the mixture, and drawing off of the carbonic acid and steam at the top, and the monocarbonate as a semi-liquid mud at the bottom.

2. The improvement in the process of obtaining carbonic acid and monocarbonate of soda from bicarbonate, which consists in mixing the bicarbonate with water at about 60° centigrade, and then treating it with steam and ammonia in a closed chamber.

3. The improvement in the process of obtaining monocarbonate of soda and carbonic acid, which consists in treating the bicarbonate of soda with ammonia at a temperature such as is described, whereby the ammonia combines with one molecule of the carbonic acid, and then heating the carbonate-of-ammonia solution to a temperature such as described, whereby the carbonic acid and ammonia dissociate, the ammonia again combining with more carbonic acid in the lower portion of the liquor, substantially as described.

4. The process of manufacturing monocarbonate of ammonia and carbonic acid, which consists in heating the bicarbonate in water in the presence of ammonia to near but below the boiling-point.

5. The continuous process of producing monocarbonate of soda and carbonic acid from bicarbonate of soda, which consists in heating in presence of ammonia to at least 60° centigrade an aqueous solution of the said bicarbonate or a mixture of bicarbonate in the solid state with water or with a solution of another carbonate of soda, the same being heated in one part more than in another, so as to have different zones of heat, and so that the ammonia in one zone combines with the carbonic acid, and in the other zone disengages that carbonic acid so that it can be removed from the vessel in a gaseous form.

6. The combination, with the mixer D, the gas-trap B, and the condenser C, of the column X Y Z, with its pipes and appurtenances as a plant for the manufacture of monocarbonate of soda, substantially as described.

7. In a monocarbonate-of-soda plant, the combination, with a column X Y Z, of a heating and mixing apparatus C, whereby the bicarbonate can be mixed with the water before being exposed to sufficient heat to dissociate any carbonic acid from it, and is then further heated and deprived of its carbonic acid.

8. In a plant for making monocarbonate of soda, a columnar vessel X Y Z, having baffling plates or bells I I J J L L, and entrance E for steam near the bottom entrance M for materials, and exit-pipe for carbonic acid near the top.

9. In a plant for making monocarbonate of soda and carbonic acid, a column X Y Z, having an entrance for steam E at bottom and a heating-coil M in the upper zone.

10. In a plant for making monocarbonate of soda, a column X Y Z, divided into a series of zones by plates I J L, and having two heating devices E and M at the bottom and at a much higher point.

11. In a plant for making monocarbonate of soda and carbonic acid, in combination with a column, such as X Y Z, a gas-trap B, and condenser C, substantially as described.

In testimony whereof I have signed my name to this specification in the presence of two subscribing witnesses.

L. A. STAUB.

Witnesses:
WM. P. THOMPSON,
H. P. SHOOBRIDGE.